United States Patent [19]
Zeitner, Jr. et al.

[11] 3,909,297
[45] Sept. 30, 1975

[54] LITHIUM-CHLORINE BATTERY DESIGN

[75] Inventors: Edward J. Zeitner, Jr., Utica, Mich.; John H. Kennedy, Santa Barbara, Calif.

[73] Assignee: The United States of America as represented by the Secretary of the Navy, Washington, D.C.

[22] Filed: May 10, 1968

[21] Appl. No.: 729,142

[52] U.S. Cl................................................. 136/86 A
[51] Int. Cl.²........................................ H01M 8/00
[58] Field of Search ........ 136/86, 86 A, 86 D, 120, 136/120 FC, 90

[56] References Cited
UNITED STATES PATENTS

| | | | |
|---|---|---|---|
| 3,338,749 | 8/1967 | Johnson et al. | 136/86 A |
| 3,484,290 | 12/1969 | Knight | 136/120 X |

*Primary Examiner*—Harvey E. Behrend
*Attorney, Agent, or Firm*—R. S. Sciascia; J. A. Cooke

[57] ABSTRACT

A lithium-chlorine fuel cell having a porous graphite cathode through which gaseous chlorine is diffused into an electrolyte containing reaction chamber, and a molten lithium-wettable metallic fiberous matrix anode which is capable of delivering molten lithium to said reaction chamber. A method for activating the fuel cell. A battery having at least one of the fuel cells attached in series.

7 Claims, 2 Drawing Figures

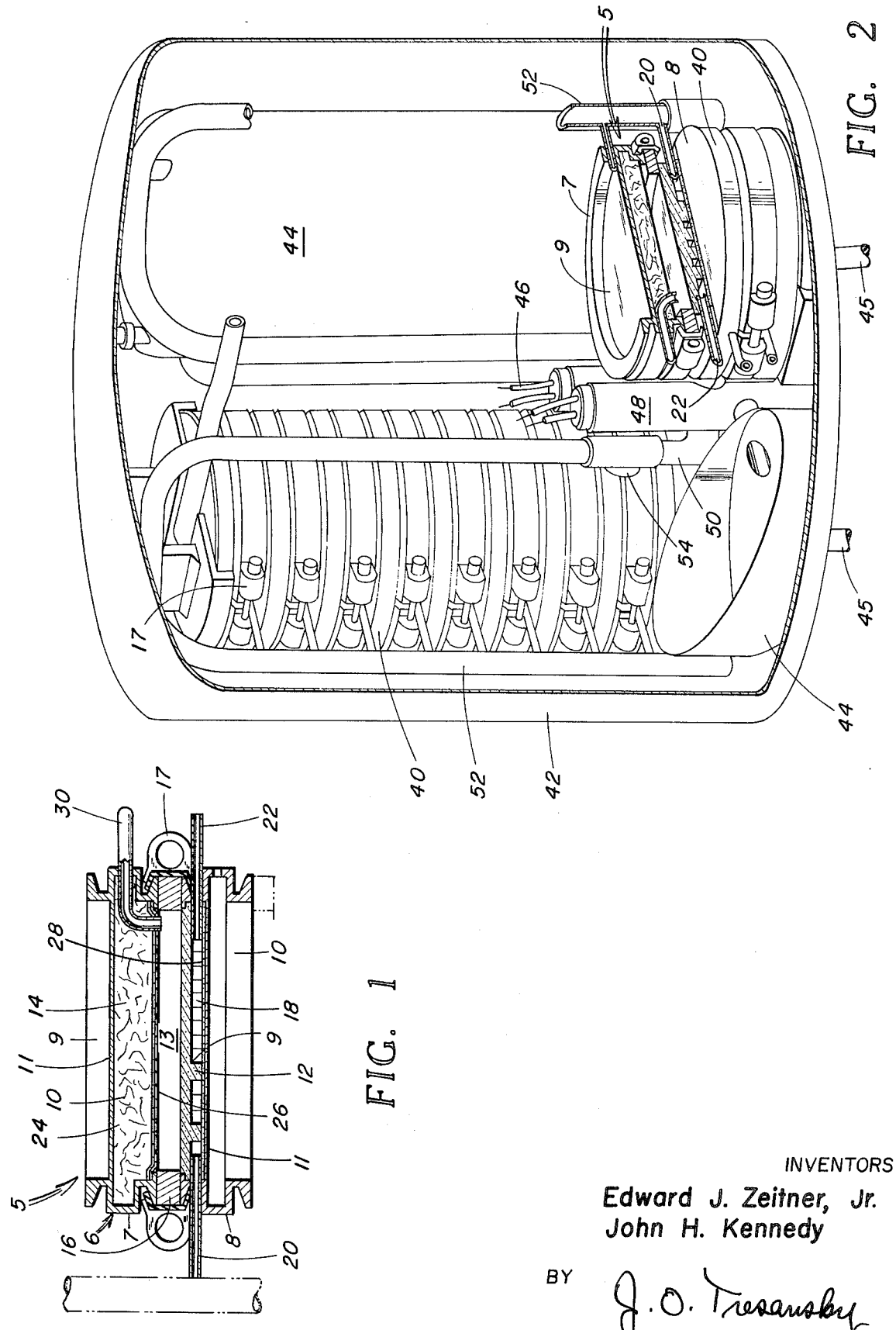

3,909,297

LITHIUM-CHLORINE BATTERY DESIGN

BACKGROUND OF THE INVENTION

This invention generally relates to fuel cells, and more particularly to a method for converting chemical energy into electrical energy, an electrochemical fuel cell which provides for such energy conversion, and a battery composed of a plurality of said fuel cells.

An electrochemical cell, as the term is applied herein, is one which provides for the direct energy conversion of the chemical free energy of combustion into usable electrical energy without passing through an intermediate energy stage such as heat, etc. Such a cell in its simplest form is composed of a cathode, an anode and an electrolyte, which separates the anode from the cathode. At one electrode, the anode, the reactant loses electrons to the electrode phase by oxidation, while at the other electrode, referred to herein as the cathode, the oxidizing agent gains electrons from the electrode phase by reduction. The electrons are transferred from the substance undergoing oxidation to the oxidizing agent via an external electrical circuit path which provides the desirable electrical energy output. In electrochemical cells known as fuel cells, both the fuel being oxidized as well as the oxidizing agent are continuously fed into the cell as power and the products of reaction are continuously withdrawn. Through the proper selection of the fuel cell reactants and by the complete withdrawal of the reaction products, the fuel cell theoretically can be operated for an indefinite period of time without degradation or weakening of the power output.

A great amount of effort has gone into the development of different types of fuel cells for numerous applications. Some cells, commonly known as "hydrox" cells, utilize reactions of hydrogen and oxygen. High temperature gas cells use reducing fuels such as gaseous hydrocarbons and solid cast electrolytes which are molten at operating temperatures. Still other "redox" cells utilize intermediate solutions which are reactive at the electrodes to yield electrical power and which are then regenerated externally by reaction with a primary fuel.

The value of a particular cell in any given application is generally dependent on the amount of power which is provided per pound of fuel cell over a given period of time. Although fuel cells are known which will generate a high degree of power, as measured by their high energy density or high power density outputs, and other cells are available which will generate their peak output in a relatively short period of time, there is no cell presently available which will perform these functions to the degree sufficient to satisfy the exigencies of recent advances in weaponry and space exploration. Such applications require a fuel cell capable of providing an extremely high energy density and a high power density output and which is capable of delivering peak output within a relatively short period of time after the initial activation of the cell, often within 30 to 90 seconds. Furthermore, a fuel cell fulfilling military requirements must be non-gravity oriented and hence capable of operating at near zero or at slight artifically created gravity conditions. The desired cell also should be relatively light weight, small in volume and capable of being compactly arranged in series or parallel electrical relationships with other fuel cells of similar type so as to provide for variable power output. For the purpose of this disclosure, cells arranged in a series or parallel combination will be referred to as "batteries."

SUMMARY OF THE INVENTION

It is therefore an object of this invention to provide a fuel cell which is especially adaptable to military and outer-space applications.

It is also an object to provide a compact, efficient fuel cell capable of supplying a high energy density and high power density output.

Another object of the present invention is to provide a fuel cell capable of quick activation such that peak power output is provided within approximately 90 seconds or less.

A further object is to provide for a method of quick activation of a fuel cell.

Another object is to provide a battery composed of a plurality of fuel cells according to this invention, which permits variable power output.

It is a further object of this invention to provide a fuel cell which is not gravity oriented and which can be used under near zero or slight artificially created gravity conditions.

These and other objects are attained by providing a fuel cell capable of facilitating an electrochemical reaction in which molten lithium fuel is continuously oxidized while hot gaseous chlorine is continually reduced and in which molten lithium chloride and a useable source of electrical energy is continuously generated.

BRIEF DESCRIPTION OF THE DRAWINGS

The invention will be further described in conjunction with the accompanying drawings, in which FIG. 1 is a cross-sectional view of one embodiment of fuel cell to provide the aforementioned reaction, and FIG. 2 is a side elevational view, partly in section, of a battery of fuel cells of this invention arranged in a series-parallel relationship and having a common housing and a common chlorine feed source.

DETAILED DESCRIPTION OF THE PREFERRED EMBODIMENTS

The fuel cell of this invention generates power through the electrochemical reaction of molten lithium with gaseous chlorine. To provide for this reaction a fuel cell is formed from a pair of opposing electrodes separated by an electrolyte-containing reaction chamber. The cathode, or positive electrode, generally is formed of a porous graphite mass through which gaseous chlorine is diffused and introduced at a controlled rate into the electrolyte-containing reaction chamber. The anode, or negative electrode, is formed from a matrix or a mesh of lithium-wettable iron or stainless steel fibers which are fitted into the cell so as to form an interface with the electrolyte composition contained within the reaction chamber.

Lithium is oxidized at the electrolyte-mesh interface and provides electrons to the external circuit which runs from the metal fiber matrix to the porous graphite. Concurrently, chlorine is reduced at the graphite-electrolyte interface thereby withdrawing electrons from the external circuit. The product of this reaction is molten lithium chloride which is removed from the chamber through specially provided vents.

Referring now to the embodiment of FIG. 1, a fuel cell 5, according to the present invention, is shown as a cylindrical housing or casing 6 formed of a pair of electrode supporting assemblies 7 and 8. Each assembly includes a cathode element carrier section 9 and an anode element carrier section 10 separated from each other by a partition or boundary wall 11. A disc shaped cathode or positive electrode 12 and a disc shaped anode or negative electrode 14 is positioned in their respective carriers 9 and 10, respectively. For purposes of simplicity and clarity these electrode are the sole electrodes illustrated in the drawing. Disposed within the housing 6 is a reaction chamber 13 formed by the surfaces of the cathode 12, the anode 14, and an insulating ring 16 which is positioned between the electrode supporting assemblies 7 and 8 adjacent the outer peripheries thereof. A conventional clamping arrangement 17 maintains the electrode supporting assemblies 7 and 8 and the ring 16 in the assembled condition. The disc shaped positive electrode 12 is formed from a porous graphite mass containing, at the surface opposite to the surface facing the chamber 13, a plurality of recessed portions forming internal ducts 18 which facilitate the passage of the gaseous chlorine through the graphite. Chlorine is fed into the ducts via a gas inlet conduit 20 which passes through the housing into the cathode. Excess chlorine is released via an exit conduit 22 which passes from the graphite mass through the housing. For the purposes of this invention, any porous graphite is a suitable cathode material but it has been found that FC-11 Graphite is especially suitable because of its good structural and electrical properties.

The anode disc 14, is formed from a low density matrix, or mesh, of metallic fibers which are characterized by being wettable by molten lithium.. For this purpose, compacted iron fibers or fine stainless steel fibers have been found to be especially suitable, but the invention is not limited to these particular fibers and any metal which meets the foregoing requirements will provide similar results.

The anode mesh is loaded with lithium by dipping it into molten metal which has been heated to a temperature sufficient to reduce any oxide formed on the metal mesh, thereby presenting an elemental metal surface to the molten lithium. By this technique, the voids of the mesh, which initially constitute 90–95% of the structure, can be substantially completely filled with lithium.

Since the matrix is not of structurally stable material, it is usually necessary to contain it by a structural boundary 26 which forms the anode interface with the electrolyte in the chamber 13. For this purpose, it has been found that use of a sintered screen of fine porosity is especially suitable, although coarser screen materials also may be used. One particularly good boundary material is a mesh of rolled and sintered stainless steel 347 fibers known commercially as Regimesh which is available in a form having a microporosity of about 10 to 17 $\mu$. A layer of about 1 to 10 mils thick is normally adequate.

In the embodiment shown, the anode 14 is separated from the cathode 12 by the insulating ring 16 formed of a suitable material such as beryllium oxide or aluminum oxide. Although use of such an insulating material is a structurally sound means for separating the electrodes 12 and 14, under particular conditions other methods may also be used, for example, the electrodes 12 and 14 may be maintained spatially displaced by the battery housing itself.

The combination of anode and cathode is housed in the assembled cylindrical metal casing 6 which additionally serves as a bipolar electrode or external circuit. To minimize the corrosive effect of the hot chlorine on the metal, the chlorine-containing graphite is separated from the the casing by a high density graphite boundary 28.

In practice, the cell operates at a temperature sufficient to maintain the lithium and the electrolyte in a liquid or molten state, usually about 610° to 650°C. Higher or lower temperatures, however, may also be used depending upon the particular composition of the electrolyte used.

For the purposes of this invention, lithium chloride has been found to be an ideal electrolyte in that it is of the same composition as the cell reaction products. Other electrolyte compositions, however, may also be used to facilitate quicker cell initiation.

The molten lithium wets the matrix material and tends to flow toward the interface where it reacts with the cathode chlorine to form molten lithium chloride. The product lithium chloride is then discharged from the chamber by a specially provided vent 30 which passes from the electrolyte containing chamber 13 to the intra-battery region or to a lithium chloride collecting chamber, not shown.

In general, the limiting cell current density increases in approximately a linear relationship with increasing gas pressure, up to about 60 psi and 4 amps/cm$^2$. Current densities of more than 5 amps/cm have been obtained at pressures of less than 200 psi.

In order to start the cell operation it is necessary to bring the internal materials to a sufficiently high temperature to melt the lithium and to cause a chlorine-lithium reaction. To continue the cell operation, the temperature must thereafter be maintained at a point hot enough to melt the lithium chloride product as it is formed. If the temperature is below this critical point, lithium chloride will freeze, blocking the continued flow of chlorine to the molten lithium anode.

One simple method for starting the cell operation is to heat the entire cell 5 in a suitable furnace until the desired temperature are obtained. Once steady state reaction is initiated, the exothermic heat generated by the cell reaction will normally maintain the proper temperature. This technique, however, is hardly suited for many applications where the weight of the external heating source would make the use of the battery prohibitive.

Another technique for starting the cell, which eliminates the furnace type arrangement, involves initiating a low temperature, high exothermic chemical reaction in the cell's external region. The most desirable technique, however, is to provide a high exothermic internal chlorine reaction. By this method, cell activation periods as short as thirty seconds to ninety seconds are obtainable. One embodiment of this technique which is the subject of Ser. No. 598,452 filed Dec. 1, 1966, includes interspersing a mixture of lithium and potassium in the lithium chloride electrolyte within the reaction chamber. Chlorine will react with potassium at very low temperatures and pressures and said reaction is highly exothermic. The product of the lithium-chlorine, potassium-chlorine reaction is a potassium chloride-lithium chloride eutectic mixture which melts several hundred degrees below either pure lithium chloride or pure potassium chloride alone (m.p. of eutectic equals 359°C, m.p. of lithium chloride equals 613°C, m.p. of potassium chloride equals 776°C) and which permits sustained cell operation at significantly lower temperatures.

Once the cell begins actual operation, several changes will occur. As the lithium reacts, LiCl is formed, and the eutectic will be displaced through the electrolyte vent. As the reaction continues, the composition within the chamber 13 is eventually filled solely with pure LiCl. During this time, the conductivity of the electrolyte almost triples, which has the effect of increasing cell efficiency. If the heat input is insufficient to continually raise the cell operating temperature as the eutectic mix is replaced by pure lithium chloride, the electrolyte will freeze and the cell will cease to operate. By minimizing the heat losses from the system, the exothermic heat from the chlorine-lithium reaction will be sufficient to maintain the electrolyte in its molten state for the life of the cell.

One of the advantages of the fuel cell of the present invention is that it may be compactly combined in series with similar fuel cells so as to provide the necessary power output for any given application. Accordingly, the casing 6 of one cell can be used as the outer casing for the next cell, such that the same boundary wall 11 is simultaneously in contact with the matrix-containing lithium anode of one cell and the graphite cathode of the other. This relationship can be further understood by reference to FIG. 2 which shows a battery of the fuel cells of this invention. In this embodiment, two columns 40 of stacked fuel cells 5 are placed in series within a suitable housing 42. Clamp rings 17 are used to hold the individual electrode supporting assembles 7 and 8 together and the resulting cells 5 are held in their stacked arrangement by being fitted one within the other, each sharing a common boundary wall with the adjacent cells. Although in this embodiment, two chlorine storage tanks 44 are also accomodated within the same housing, it should be understood that the housing may alternatively contain only one or more cell columns with the chlorine tanks being placed in a region external to the battery housing. Power is taken from the fuel cells by means of external electrically conductive leads 45.

Chlorine is fed from said storage tanks 44 through a feed conduit 50 into connecting manifolds 52 and then into the chlorine gas inlet conduit 20 of the individual cells. A standard pyrotechnic valve 48 having connection electrical leads 46 is placed within the gas feed conduit. When activation of the battery is desired, an electrical signal is passed through said leads which detonates a small explosive charge opening said valves and permitting the free passage of chlorine into said manifolds.

Although the use of a minimum quantity of chlorine would be most desirable to minimize the weight of the battery, it has been found that the use of an excess quantity of gas will reduce polarization losses which are caused by the entrapment of gaseous impurities within the pores of the graphite. The sweep of the excess gas stream past the graphite pores tends to dislodge these impurities and permits continued free entry of gas into the reaction chamber. The excess gas flow must then be either vented to a point outside the battery or recovered and recirculated using a suitable pump to recover lost pressure. In this embodiment, the excess chlorine gas is vented to the intra-portion of the battery housing through the exit conduit 18. The gas can then be recirculated through a suitable recovery means such as a Venturi tube jet pump 54 which consists of two concentric nozzles, a mixing region and a diffuser section. In this type of pump, the primary high pressure flow from the storage tanks is discharged at a relatively high velocity sufficient to entrain the secondary flow from the recirculated gas supply. The two flows combine in a mixing region and pressure is recovered in the diffuser section. Once the reaction demand for chlorine is established, the jet pump operates to maintain the flow to the inlet manifolds.

As is evident from the foregoing description, the aforementioned objects of this invention are amply achieved by the present fuel cell. For example, since the lithium feed is based on the wetting action, or surface phenomena, of the molten lithium on the anode matrix fibers, the cell is not gravity dependent and hence will operate equally well regardless of whether it is subjected to zero gravity or artifical gravity conditions. Moreover, even if the cell is subjected to an intense gravity condition, it will operate at least equally as well and, by simple design modification of the lithium chloride vent, will operate with somewhat greater efficiency, since the gravity can then be used to facilitate removal of the product lithium chloride. In the absence of gravity, such removal is facilitated by the pressure of the entering reactants to the electrolyte chamber.

The energy output per unit weight of cell per time, of the present cell is exceptionally high largely due to both the very low resistance offered by the lithium chloride electrolyte and to the high performance capabilities of the lithium-containing anode and the gaseous chlorine-containing cathode.

Finally, the present fuel cell is capable of unexpectedly fast activation which will meet the military demand for a fuel cell capable of delivering a high energy density output within periods of time of 90 seconds or less.

While the invention has been described with reference to various particularly preferred embodiments thereof, it is to be appreciated that modifications and variations can be made without departing from the scope of the invention as set forth in the foregoing specification and the following claims.

What is claimed as new and desired to be secured by Letters Patent is:

1. A stackable lithium-chlorine fuel cell comprising:
 a cylindrical housing having a plurality of spaced boundary walls disposed therein;
 a cylindrical porous graphite cathode in contact with one boundary wall of said housing;
 a cylindrical anode in contact with another boundary wall of said housing, said anode comprising a low density matrix of molten lithium-wettable metallic fibers having interspersed therein a charge of metallic lithium;
 an insulating ring separating said cathode from said anode and forming therebetween a chamber suitable for containing a molten lithium chloride electrolyte;
 means for feeding gaseous chlorine into said porous graphite cathode;
 means for venting from said chamber lithium chloride reaction products formed by the cell reaction;

said one boundary wall and said other boundary wall positioned to contact the anode and cathode respectively of adjacent fuel cells.

2. The fuel cell of claim 1 wherein said cylindrical housing includes:
   a plurality of electrode supporting assemblies;
   each assembly having an anode carrier section and a cathode carrier section;
   a boundary wall separating said assemblies;
   said anode carrier section of one assembly facing said cathode carrier section of another assembly and separated therefrom by said insulating ring;
   and means for clamping said electrode supporting assemblies and said insulating ring in an assembled relation.

3. The fuel cell of claim 1 wherein said metallic fibers are selected from the group consisting of iron fibers and stainless steel fibers, and said matrix contains about 90% – 95% voids which are essentially filled with lithium.

4. The fuel cell of claim 3 wherein said matrix is separated from said reaction chamber by a structural boundary which forms an interface with the electrolyte in said reaction chamber and which comprises a rolled and sintered mesh of stainless steel fibers having a porosity of 10–17 $\mu$.

5. The fuel cell of claim 4 wherein a layer of high density graphite is interposed between said porous graphite anode and said bottom surface of said housing so as to protect the bottom surface from chlorine corrosion.

6. A lithium-chlorine fuel cell battery which comprises:
   a plurality of fuel cells, each fuel cell including a cylindrical housing having a plurality of spaced boundary walls disposed therein;
   a cylindrical porous graphite cathode in contact with one boundary wall of said housing;
   a cylindrical anode in contact with another boundary wall of said housing, said anode comprising a low density matrix of molten lithium-wettable metallic fibers having interspersed therein a charge of metallic lithium;
   an insulating ring separating said cathode from said anode and forming therebetween a chamber suitable for containing a molten lithium chloride electrolyte;
   means for feeding gaseous chlorine into said porous graphite cathode;
   means for venting from said chamber lithium chloride reaction products formed by the cell reaction;
   said one boundary wall and said other boundary wall positioned to contact the anode and cathode respectively of adjacent fuel cells,
   a plurality of chlorine storage chambers suitable for retaining gaseous chlorine under pressure,
   conduits connecting said storage chambers with said fuel cells suitable for transporting gaseous chlorine to said cells.

7. The lithium-chlorine fuel cell battery of claim 6 wherein a pyrotechnic valve is interposed in said conduit between said storage chamber and said fuel cells such that upon electrical activation of said valve, the pressurized gaseous chlorine in said chamber is permitted to flow to said fuel cells.

* * * * *